(12) United States Patent
Kwak et al.

(10) Patent No.: US 9,296,903 B2
(45) Date of Patent: Mar. 29, 2016

(54) FILM FORMATION COMPOSITION FOR PREVENTING BLACKENING OF STEEL SHEET, AND STEEL SHEET HAVING FILM FORMED BY COMPOSITION

(75) Inventors: Young-Jin Kwak, Gwangyang-si (KR); Dong-Yun Kim, Anyang-si (KR); Woo-Sung Jung, Gwangyang-si (KR); Kyung-Hoon Nam, Gwangyang-si (KR); Dong-Yoeul Lee, Gwangyang-si (KR); Seok-Jun Hong, Gwangyang-si (KR); Tae-Yeob Kim, Gwangyang-si (KR); Yong-Hwa Jung, Gwangyang-si (KR); Mun-Jong Eom, Gwangyang-si (KR); Myoung-Hee Choi, Anyang-si (KR); Gab-Yong Kim, Nam-gu (KR); Sang-Hoon Park, Gwangyang-si (KR); Sang-Cheol Lee, Gwangyang-si (KR); Yang-Woo Nam, Gwangyang-si (KR)

(73) Assignees: POSCO, Pohang-si (KR); NOROO COIL COATINGS CO., LTD., Anyang-si (KR)

( * ) Notice: Subject to any disclaimer, the term of this patent is extended or adjusted under 35 U.S.C. 154(b) by 0 days.

(21) Appl. No.: 14/005,567

(22) PCT Filed: Mar. 28, 2012

(86) PCT No.: PCT/KR2012/002294
§ 371 (c)(1),
(2), (4) Date: Sep. 17, 2013

(87) PCT Pub. No.: WO2012/134179
PCT Pub. Date: Oct. 4, 2012

(65) Prior Publication Data
US 2014/0011048 A1      Jan. 9, 2014

(30) Foreign Application Priority Data

Mar. 28, 2011  (KR) .......................... 10-2011-0027814

(51) Int. Cl.
| | |
|---|---|
| B32B 15/092 | (2006.01) |
| C09D 5/08 | (2006.01) |
| C09D 7/12 | (2006.01) |
| C23C 26/00 | (2006.01) |
| C23C 30/00 | (2006.01) |
| C09D 171/00 | (2006.01) |
| C08K 3/08 | (2006.01) |
| C08K 3/16 | (2006.01) |

(52) U.S. Cl.
CPC ................ *C09D 5/08* (2013.01); *C09D 7/1216* (2013.01); *C09D 171/00* (2013.01); *C23C 26/00* (2013.01); *C23C 30/00* (2013.01); *C08G 2650/56* (2013.01); *C08K 3/08* (2013.01); *C08K 3/16* (2013.01); *Y10T 428/12569* (2015.01)

(58) Field of Classification Search
None
See application file for complete search history.

(56) References Cited

U.S. PATENT DOCUMENTS

| | | | |
|---|---|---|---|
| 5,427,632 A | 6/1995 | Dolan | |
| 6,217,674 B1 * | 4/2001 | Gray et al. | 148/247 |
| 7,517,591 B2 | 4/2009 | Miyoshi et al. | |
| 7,736,730 B2 * | 6/2010 | Jung et al. | 428/323 |
| 7,754,799 B2 | 7/2010 | Araki et al. | |
| 2007/0190259 A1 * | 8/2007 | Bittner et al. | 427/407.1 |
| 2008/0070018 A1 * | 3/2008 | Miyoshi et al. | 428/216 |
| 2009/0252952 A1 * | 10/2009 | Noh et al. | 428/328 |
| 2010/0209732 A1 * | 8/2010 | Hackbarth | C23C 2/26 428/659 |
| 2010/0272991 A1 * | 10/2010 | Park et al. | 428/341 |
| 2010/0285333 A1 * | 11/2010 | Kwak et al. | 428/659 |

FOREIGN PATENT DOCUMENTS

| | | | |
|---|---|---|---|
| CN | 1128053 A | 7/1996 | |
| EP | 0826747 A2 | 3/1998 | |
| JP | 09143679 A | 6/1997 | |
| JP | 09241828 A | 9/1997 | |
| JP | 1060233 A | 3/1998 | |
| JP | 2009-248460 | 10/2009 | |
| JP | 2009248460 * | 10/2009 | ............. B32B 15/08 |
| KR | 20060022276 A | 3/2006 | |
| KR | 20070069169 A | 7/2007 | |
| KR | 100784084 B1 | 12/2007 | |
| KR | 1020080050525 A | 6/2008 | |
| KR | 1020090017868 A | 2/2009 | |
| WO | 01/48265 A1 | 7/2001 | |
| WO | 2007/075050 A1 | 7/2007 | |

* cited by examiner

*Primary Examiner* — Humera Sheikh
*Assistant Examiner* — Seth Dumbris
(74) *Attorney, Agent, or Firm* — The Webb Law Firm

(57) ABSTRACT

Provided is a film formation composition for improving the blackening of the surface of a steel sheet, particularly, the surface of a steel sheet containing Mg on the surface thereof, such as a Mg sheet, a plated steel sheet having a plated layer comprising Mg, and the like, a steel sheet comprising a film formed by the composition, and a method for forming the film. Provided are a film formation composition for preventing the blackening of the surface of the steel sheet, comprising: 2.5-7.5 parts by weight of a water-soluble phenoxy resin; 0.1-0.5 parts by weight of a fluorometal acid; 0.1-0.5 parts by weight of a metal compound; and 1-5 parts by weight of a cross-linking agent.

13 Claims, No Drawings

FILM FORMATION COMPOSITION FOR PREVENTING BLACKENING OF STEEL SHEET, AND STEEL SHEET HAVING FILM FORMED BY COMPOSITION

TECHNICAL FIELD

The present invention relates to a composition for forming a blackening resistance film on a steel sheet, particularly, a steel sheet having magnesium (Mg) on the surface thereof, such as an Mg steel sheet or a steel sheet plated with an Mg-containing material, and to a steel sheet having a blackening resistance film formed of the composition.

More particularly, the present invention relates to a composition for forming a film on a steel sheet containing Mg on the surface thereof such as an Mg steel sheet and a steel sheet plated with an Mg-containing material so as to prevent blackening of the steel sheet for maintaining the sheen and aesthetic appearance of the steel sheet even in high-temperature, high-humidity regions, and to a steel sheet including a film formed by the composition.

BACKGROUND ART

In the steel industry, surface-treated steel sheets are produced as high value products widely used in automobiles, home appliances, construction, and containers. Surface-treated steel sheets having various features are being required as industry advances.

Various surface treatment techniques are used to improve the corrosion resistance of steel sheets, and most of the surface treatment techniques involve wet processes such as electroplating, hot dipping, chemical conversion treatment, and painting. Zinc has commonly been used as a material for improving the corrosion resistance of steel products, and various methods such as adding other materials or using PVD or CVD processes have been studied and proposed for improving the properties of zinc plating layers and to satisfy increased customer demand for highly corrosion resistant steel products. In addition, as the use of magnesium (Mg) having a high degree of specific strength increases in many industries such as the automobile and electronics industries, there is increasing interest in steel sheets containing magnesium.

Mg steel sheets and Mg-alloy-plated steel sheets such as Zn—Al—Mg—, Zn—Al—Mg—Si—, Zn—Mg—, Mg/Zn—, Al—Mg—, or Al—Mg—Si-plated steel sheets are highly corrosion-resistant; however, while being transported or stored in high-temperature and high-humidity areas, Mg steel sheets or Mg-alloy-plated steel sheets may be blackened by oxygen or moisture contained in the atmosphere (known as a blackening phenomenon).

When a plated steel sheet containing Mg makes contact with moisture, hydroxides and/or oxides of Mg and Zn may be formed on the surface of the plated steel sheet, which are considered to be the cause of a blackening phenomenon. Such a blackening phenomenon may spoil the appearance of a steel sheet to lower the value of the steel sheet, and customers may file claims against vendors providing blackened steel sheets.

Therefore, there have been various efforts to prevent or suppress the blackening of steel sheets having Mg on the surfaces thereof such as an Mg steel sheet and a steel sheet plated with an Mg-containing material.

According to typical methods for preventing or suppressing a blackening phenomenon, Mg steel sheets or Mg-alloy-plated steel sheets may be oiled, anodized, or coated. However, oiling is not suitable for preventing a blackening phenomenon in the case of storing steel sheets for a long period of time.

Anodizing may be used instead of a PVD or CVD process to improve the rate of plating or film forming and thus to improve workability and productivity. In an anodizing process, the surface of a steel sheet is etched to remove oxides, and the etched portion and other exposed portions of the steel sheet are firmly coated with an oxide film (anodic film) to prevent a blackening phenomenon. However, large amounts of strong inorganic acids, toxic to the environment and humans, are used to form such anodic films. In addition, the anodizing process is complicated and time-consuming compared to other processes in a continuous production line, and thus it may be difficult to apply such an anodizing process to a continuous production line.

Steel sheets may be coated with organic films, mostly organic silane films to prevent a blackening phenomenon. However, this method requires a high processing temperature to form inorganic films and a long period of time to dry inorganic films. Therefore, spray coating methods applicable to continuous production lines have been proposed to prevent a blackening phenomenon.

A surface treatment technique using a spray coating method is disclosed in Korean Patent Application Laid-open Publication No. 2007-0082367. In the disclosed technique, an anodic film is formed on an Mg alloy product through ten steps. Except for a product mounting step, a dyeing step, and a drying step, seven steps are actually involved in the surface treatment. However, the disclosed technique is not for steel sheets but for steel parts and is uneconomical because of an excessive amount of steps and a long processing time.

U.S. Pat. No. 7,754,799 discloses a method for improving the chemical resistance of a magnesium alloy steel sheet using titanium chelate, epoxy silane, calcium carbonate treated with paraffin, and zinc oxide treated with organic polysiloxane, non-reactive silicon oil, and silane. Although this method requires a low processing temperature, the drying process time thereof may be relatively long, and organic polysiloxane and silicone oil make it difficult to apply topcoat paint. Therefore, it is difficult to use the disclosed method according to various usages of magnesium steel sheets or alloy steel sheets.

Japanese Patent Application Laid-open Publication No.: 1997-241828 discloses a technique for preventing a blackening phenomenon by dipping a Zn—Mg plated steel sheet in a phosphoric acid pickling solution containing 0.01 wt % to 30 wt % of a phosphoric acid to reduce the concentration of Mg in the surface of a Zn—Mg plating layer to 1% or less and thus to suppress the generation of hydroxides or oxides of magnesium. However, during the treatment using the phosphoric acid pickling solution, the sheen and surface qualities of the Zn—Mg plated steel sheet may be spoiled, and it is necessary to remove sludge remaining on a pickled area of the Zn—Mg plated steel sheet.

Japanese Patent Application Laid-open Publication No.: 1997-143679 discloses a technique of previously blackening the surface of a Zn—Mg plated steel sheet. According to the disclosed technique, Zn and Mg are sequentially deposited on a steel sheet, and the steel sheet is heated to plate the steel sheet with a Zn—Mg alloy film (Zn—Mg plating film) having a predetermined thickness and a single-, double-, or triple-layer structure. Then, the plated steel sheet is left at a temperature as high as 80° C. and in humidity as high as 80% for 10 minutes to 60 minutes so as to modify the surface of the plated steel sheet to $Mg(OH)_2$, Zn, and ZnO. However, according to the disclosed technique, the surface of the Zn—Mg plating film may not be uniformly blackened, and thus the appearance of the steel sheet may be poor. That is, the characteristics of a Zn—Mg plated steel sheet such as a highly sleek and aesthetic appearance may not be obtained. Thus, the value of steel sheet products may be lowered, and the defective rate of steel sheet products may be increased.

SUMMARY OF THE INVENTION

Technical Problem

An aspect of the present invention provides a composition for forming a blackening resistance film on a steel sheet containing magnesium (Mg) on the surface thereof such as an Mg steel sheet and an Mg-alloy-plated steel sheet so as to improve the blackening resistance ability and workability of the steel sheet and maintain the aesthetic appearance of the steel sheet. Aspects of the present invention also provide a blackening resistance film formed by the composition, a steel sheet containing Mg on the surface thereof and coated with a film formed by the composition, and a method of forming a film using the composition.

According to an aspect of the present invention, there is provided a composition for forming a blackening resistance film on a steel sheet containing magnesium, the composition including: 2.5 to 7.5 parts by solid weight of a water-soluble phenoxy resin; 0.1 to 0.5 parts by solid weight of a fluorometallic acid; 0.1 to 0.5 parts by solid weight of a metallic compound; and 1 to 5 parts by solid weight of a crosslinking agent.

The water-soluble phenoxy resin may have a number average molecular weight of 20,000 to 60,000.

The fluorometallic acid may include at least one selected from the group consisting of hexafluorotitanic acid, hexafluorosilicic acid, hexafluorozirconic acid, hexafluorotungstic acid, hexafluoromolybdic acid, and hexafluorogermanic acid.

The metallic compound may include at least one selected from the group consisting of silicon, aluminum, manganese, titanium, cerium, zinc, molybdenum, vanadium, zirconium, and combinations thereof. The metallic compound may exist in water as a salt and/or a nano-sized colloid.

The crosslinking agent may include at least one selected from the group consisting of 3-glycidoxypropyltrimethoxysilane, 2-(3,4-epoxycyclohexyl)ethyltrimethoxysilane, 2-(3,4-epoxycyclohexyl)ethyltriethoxysilane, and 3-glycidoxypropylmethyldiethoxysilane.

According to another aspect of the present invention, there is provided a steel sheet including: magnesium on at least a surface thereof; and a blackening resistance film formed by the composition.

The blackening resistance film may be formed on the surface of the steel sheet containing magnesium and have a dry density of 100 mg/m$^2$ to 1000 mg/m$^2$.

The steel sheet may be a magnesium steel sheet, a magnesium-plated steel sheet, or a magnesium-alloy-plated steel sheet. The magnesium-alloy-plated steel sheet may include a magnesium alloy plating layer selected from the group consisting of Zn—Al—Mg, Zn—Al—Mg—Si, Zn—Mg, Mg—Zn, Al—Mg, and Al—Mg—Si.

According to the present invention, the composition for forming a film on a steel sheet containing magnesium (Mg) does not contain toxic chrome. In addition, since a blackening resistance aesthetic film can be formed on a steel sheet such as an Mg steel sheet and a steel sheet plated with an Mg-containing material by using the composition, the characteristic features of the steel sheet can be maintained, and the value of the steel sheet can be improved.

DETAILED DESCRIPTION OF THE INVENTION

Embodiments of the invention provide a film formation composition for forming a blackening resistance film on a steel sheet. The film formation composition includes a water-soluble phenoxy resin, a fluorometallic acid, a metallic compound, and a crosslinking agent.

The film formation composition of the embodiments is for preventing blackening of steel sheets. The film formation composition may be used for any steel sheets. For example, the film formation composition may be used for steel sheets containing magnesium (Mg) on the surfaces thereof. Examples of such steel sheets include an Mg-containing steel sheet and a steel sheet plated with an Mg alloy layer (plating layer) such as a Zn—Al—Mg, Zn—Al—Mg—Si, Zn—Mg, Mg/Zn, Al—Mg, or Al—Mg—Si alloy layer. As long as the plating layer contains Mg, the plating layer may be any kind of plating layer such as a hot dip alloy plating layer or a dry plating layer.

The film formation composition includes the water-soluble phenoxy resin as a main resin for forming a film. In a film formed on a steel sheet using the film formation composition, the water-soluble phenoxy resin may block moisture to prevent Mg included in the steel sheet from making contact with moisture. That is, the water-soluble phenoxy resin gives anti-corrosion and blackening resistance abilities to the film formation composition.

The water-soluble phenoxy resin may stably exist in water after being dissolved or dispersed. The water-soluble phenoxy resin may be a polymer resin having a number average molecular weight of 20,000 to 60,000. The water-soluble phenoxy resin having a number average molecular weight in the above range may be formed of an epoxy resin and bisphenol A. If the number average molecular weight of the water-soluble phenoxy resin is less than 20,000, a film having sufficient moisture blocking qualities may not be formed. If the number average molecular weight of the water-soluble phenoxy resin is greater than 60,000, the water-soluble phenoxy resin may not be smoothly dissolved or dispersed in water. That is, a polymer stably exist in water may not be obtained.

The water-soluble phenoxy resin may be prepared by providing a phenoxy resin with a acid-neutralizing group through a reaction with a hydroxyl-containing amine and neutralizing the phenoxy resin with phosphoric acid. After the phenoxy resin is made soluble in water as described above, the water-soluble phenoxy resin may be dissolved in water to obtain a water-soluble phenoxy resin solution. At this time, the amount of phosphoric acid may be controlled so that the pH of the water-soluble phenoxy resin solution can be within the range of 3 to 5. If the pH of the water-soluble phenoxy resin solution is below 3, magnesium may be excessively oxidized in an early stage, and smut may be formed thereon. If the pH of the water-soluble phenoxy resin solution is above 5, the water-soluble phenoxy resin may not be sufficiently dissolved or dispersed in water due to insufficient neutralization.

The film formation composition may include 2.5 to 7.5 parts by weight of the water-soluble phenoxy resin. If the film formation composition includes less than 2.5 parts by weight of the water-soluble phenoxy resin, sufficient blackening resistance and anti-corrosion effects may not be obtained. On the other hand, if the film formation composition includes greater than 7.5 parts by weight of the water-soluble phenoxy resin, the concentration of the phosphoric acid used as a neutralizing agent may be excessive, and thus the blackening resistance effect may be lowered by remaining phosphoric acid.

The fluorometallic acid may slightly fuse and react with the surface layer of magnesium included in the surface of a steel sheet to form a stable fluoride film, and some magnesium fused by the fluorometallic acid may react with the water-soluble phenoxy resin to form a chelate having an ionic crosslinking structure. In this way, the corrosion resistance of a steel sheet can be improved. Non-limiting examples of the fluorometallic acid include hexafluorotitanic acid, hexafluorosilicic acid, hexafluorozirconic acid, hexafluorotungstic acid, hexafluoromolybdic acid, and hexafluorogermanic acid. Any one or combination of the listed examples may be used as the fluorometallic acid.

The film formation composition may include 0.1 to 0.5 parts by weight of the fluorometallic acid. If the film formation composition includes less than 0.1 parts by weight of the fluorometallic acid, it may be difficult to form a hard film using the film formation composition, and thus a desired blackening resistance level may not be obtained. On the contrary, if the film formation composition includes more than 0.5 parts by weight of the fluorometallic acid, a film formed by the film formation composition may have poor waterproofing characteristics, and the film may be blackened due to initial discoloring of magnesium. Before using the fluorometallic acid, the fluorometallic acid may be diluted with water so as to prevent a cohesion) between an excessive amount of a metallic salt and the water-soluble phenoxy resin.

As mentioned above, the film formation composition of the embodiments of the invention includes a metallic compound. The metallic compound may be active in oxidation of magnesium and then eluted to form an insoluble oxide film. That is, the metallic compound may function as a blackening resistance barrier together with the water-soluble phenoxy resin so as to prevent corrosion-causing substances such as water and chlorides from making contact with magnesium.

The metallic compound may include one or more of silicon, aluminum, manganese, titanium, cerium, zinc, molybdenum, vanadium, and zirconium. For example, any one or combination of metallic compounds of the listed metals may be used as the metallic compound. The metallic compound may be dissolved in water in the form of a salt and/or a nano-sized colloid.

The film formation composition may include 0.1 to 0.5 parts by weight of the metallic compound. If the film formation composition includes less than 0.1 parts by weight of the metallic compound, the metallic compound may not participate in an oxidation-reduction reaction of fused magnesium, to cause a blackening phenomenon. If the film formation composition includes more than 0.5 parts by weight of the metallic compound, a film formed by the film formation composition may have poor waterproofing and blackening resistance characteristics like in the case where the film formation composition includes more than 0.5 parts by weight of the fluorometallic acid. Before using the metallic compound, the metallic compound may be diluted with water so as to prevent a cohesion between the water-soluble phenoxy resin and the fluorometallic acid caused by an excessive amount of the metallic compound.

The crosslinking agent may participate in coupling between molecules of the water-soluble phenoxy resin and coupling between molecules of the water-soluble phenoxy resin and magnesium included in the surface of a steel sheet. Epoxy of the molecular structure of the water-soluble phenoxy resin may be involved in crosslinking of molecules of the water-soluble phenoxy resin, and alkoxy of the molecular structure of the water-soluble phenoxy resin may be hydrolyzed by water and coupled to hydroxyl on magnesium.

Non-limiting examples of the crosslinking agent include 3-glycidoxypropyltrimethoxysilane, 2-(3,4-epoxycyclohexyl)ethyltrimethoxysilane, 2-(3,4-epoxycyclohexyl)ethyltriethoxysilane, and 3-glycidoxypropylmethyldiethoxysilane. Any one or combination of the listed examples may be used as the crosslinking agent.

The film formation composition may include 1 to 5 parts by weight of the crosslinking agent. If the film formation composition includes less than 1 part by weight of the crosslinking agent, the water-soluble phenoxy resin and magnesium may be poorly coupled to result in an insufficient blackening resistance performance. If the film formation composition includes more than 5 parts by weight of the crosslinking agent, it may be difficult to store a solution of the film formation composition, and the excessive amount of the crosslinking agent remaining after a reaction may cause a blackening phenomenon.

Every 100 parts by weight of the film formation composition may include the phenoxy resin, the fluorometallic acid, the metallic compound, and the crosslinking agent within the above-described part-by-weight ranges, and the remainder may be water.

As described above, although the film formation composition of the embodiments of the invention does not include toxic chrome, the film formation composition can be used to form an aesthetic film capable of preventing blackening of a magnesium-containing steel sheet to improve the surface quality and applicability of the magnesium steel sheet.

The film formation composition of the embodiments of the invention may be used to form a film on a steel sheet, particularly on a magnesium steel sheet or a magnesium-containing plating layer of a steel sheet, so as to effectively prevent magnesium from making contact with moisture.

A film may be formed by applying the film formation composition to a steel sheet and drying the film formation composition. The film formation composition may be applied to a steel sheet by any method. For example, application methods such as roll coating, bar coating, spin coating, dip coating, and spray coating generally used in the art to which the invention pertains may be used.

The density of a dried film formed on a steel sheet using the film formation composition is not limited. That is, the density of a dried film may be properly selected. For example, the density of a dried film may be within the range of 100 mg/m$^2$ to 1000 mg/m$^2$, preferably, 250 mg/m$^2$ to 800 mg/m$^2$. A drying temperature is not limited to a particular value. For example, a film formed on a steel sheet using the film formation composition may be dried by heating the steel sheet to 80° C. to 150° C.

MODE FOR INVENTION

Hereinafter, the present invention will be described in more detail with reference to examples. The examples are to explain the present invention, and the present invention is not limited thereto.

EXAMPLES

Preparation Example

Preparation of Phenoxy Resin

Preparation Example 1

In twenty one flasks equipped with agitators, condensers, heating mantles, thermometers, and nitrogen injection tubes, 450 g of epoxy resin (YD-128 by Kukdo Chemical Co. Ltd.), 160 g of bisphenol A, and 0.095 g of tetraammonium bromide being a catalyst were mixed and kept at 130° C. after injecting nitrogen thereto, so as to cause a reaction therebetween. After 5 reaction hours, 56 g of methyldiethanolamine were added to the mixture, and the mixture was allowed to react for 2 more hours. Thereafter, the mixture was diluted with 1237 g of 2-butoxy ethanol to obtain a phenoxy resin. The phenoxy resin had a number average molecular weight of 32,000, a solid content of 35%, and a Gardner viscosity of Z2.

The phenoxy resin was neutralized by agitating the phenoxy resin while uniformly dropping 57 g of phosphoric acid (85%) to the phenoxy resin for one hour. In this way, the phenoxy resin was made soluble. Thereafter, a water-soluble phenoxy resin solution was prepared by dissolving the water-soluble phenoxy resin in water. The water-soluble phenoxy resin solution had a sold content of 25% and a pH of about 4.

Preparation Example 2

In twenty one flasks equipped with agitators, condensers, heating mantles, thermometers, and nitrogen injection tubes, 570 g of epoxy resin (YD-104 by Kukdo Chemical Co. Ltd.), 13 g of bisphenol A, and 0.15 g of tetraammonium bromide being a catalyst were mixed and kept at 130° C. after injecting nitrogen thereto, so as to cause a reaction therebetween. After 5 reaction hours, 27 g of methyldiethanolamine were added to the mixture, and the mixture was allowed to react for 2 more hours. Thereafter, the mixture was diluted with 1133 g of 2-butoxy ethanol to obtain a phenoxy resin. The phenoxy resin had a number average molecular weight of 36,000, a solid content of 35%, and a Gardner viscosity of Z6.

The phenoxy resin was neutralized by agitating the phenoxy resin while uniformly dropping 28 g of phosphoric acid (85%) to the phenoxy resin for one hour. In this way, the phenoxy resin was made soluble in water. Thereafter, a water-soluble phenoxy resin solution was prepared by dissolving the water-soluble phenoxy resin in water. The water-soluble phenoxy resin solution had a sold content of 25% and a pH of about 4.

Preparation Example 3

In twenty one flasks equipped with agitators, condensers, heating mantles, thermometers, and nitrogen injection tubes, 300 g of epoxy resin (YD-128 by Kukdo Chemical Co. Ltd.), 106 g of bisphenol A, and 0.15 g of tetraammonium bromide being a catalyst were mixed and kept at 130° C. after injecting nitrogen thereto, so as to cause a reaction therebetween. After 5 reaction hours, 37 g of methyldiethanolamine were added to the mixture, and the mixture was allowed to react for 2 more hours. Thereafter, the mixture was diluted with 823 g of 2-butoxy ethanol to obtain a phenoxy resin. The phenoxy resin had a number average molecular weight of 19,000, a solid content of 35%, and a Gardner viscosity of Z+.

The phenoxy resin was neutralized by agitating the phenoxy resin while uniformly dropping 38 g of phosphoric acid (85%) to the phenoxy resin for one hour. In this way, the phenoxy resin was made soluble in water. Thereafter, a water-soluble phenoxy resin solution was prepared by dissolving the water-soluble phenoxy resin in water.

The water-soluble phenoxy resin solution had a solid content of 25% and a pH of about 4.

Preparation Example 4

In twenty one flasks equipped with agitators, condensers, heating mantles, thermometers, and nitrogen injection tubes, 800 g of epoxy resin (YD-104 by Kukdo Chemical Co. LTD.), 19 g of bisphenol A, and 0.15 g of tetraammonium bromide being a catalyst were mixed and kept at 130° C. after injecting nitrogen thereto, so as to cause a reaction therebetween. After 5 reaction hours, 40 g of methyldiethanolamine were added to the mixture, and the mixture was allowed to react for 2 more hours. Thereafter, the mixture was diluted with 1595 g of 2-butoxy ethanol to obtain a phenoxy resin. The phenoxy resin had a number average molecular weight of 62,000, a solid content of 35%, and a Gardner viscosity of Z6.

The phenoxy resin was agitated while uniformly dropping 89 g of phosphoric acid (85%) to the phenoxy resin for one hour, and water was added to the phenoxy resin. However, the phenoxy resin was not uniformly dissolved or dispersed in the water but sold particles of the phenoxy resin were present in the water. That is, the phenoxy resin was not suitable to use.

Samples 1 to 8 and Comparative Samples 1 to 12

Film formation composition samples for magnesium-containing steel sheets were prepared using the water-soluble phenoxy resin solutions obtained in Preparation Examples 1 to 3. The composition of film formation composition samples are shown in Table 1.

In detail, Inventive Samples and Comparative Samples were prepared using the water-soluble phenoxy resin solutions of Examples 1 to 3 having a solid content of 25% and the following materials:

Hexafluorozirconic acid (FZr) diluted with water to have a solid content of 10%;

Hexafluorotitanic acid (FTi) diluted with water to have a solid content of 10%;

Zirconium nitrate (NZr) diluted with water to have a solid content of 20%;

Cerium nitrate (NCe) diluted with water to have a solid content of 20%;

Silica diluted with water to have a solid content of 20%;

Sodium vanadate (VNa) diluted with water to have a solid content of 20%;

Crosslinking agent: silane compound, KBM 403 or KBM 303 by Shinetsu, Japan; and

Silica: colloidal silica, SNOWTEX-O by Nissan Chemical, Japan.

TABLE 1

| Unit: Parts by weight | Phenoxy resin solution | | | Fluoro-Metallic acid | | Metallic compound | | | | Crosslinking agent | | Water |
|---|---|---|---|---|---|---|---|---|---|---|---|---|
| | ***PE1 | PE2 | PE3 | FZr | FTi | NZr | NCe | Silica | VNa | KBM 403 | KBM 303 | |
| *IS1 | 15 | | | 1.5 | | | | | 1.5 | 2 | | 80 |
| IS2 | 30 | | | 1.5 | | | | | 1.5 | 2 | | 65 |
| **CS1 | 32 | | | 1.5 | | | | | 1.5 | 2 | | 63 |

TABLE 1-continued

| Unit: Parts by weight | Phenoxy resin solution | | | Fluoro-Metallic acid | | Metallic compound | | | | Crosslinking agent | | Water |
|---|---|---|---|---|---|---|---|---|---|---|---|---|
| | ***PE1 | PE2 | PE3 | FZr | FTi | NZr | NCe | Silica | VNa | KBM 403 | KBM 303 | |
| CS2 | 14 | | | 1.5 | | | | | 1.5 | 2 | | 81 |
| IS3 | 15 | | | | 1.5 | 0.5 | | | | | 1 | 83 |
| CS3 | 15 | | | | 0.8 | 0.5 | | | | | 1 | 83 |
| IS4 | 15 | | | | 5 | 0.5 | | | | | 1 | 79 |
| CS4 | 15 | | | | 5.5 | 0.5 | | | | | 1 | 79 |
| CS5 | | 15 | | 1.5 | | | 0.4 | | | 1 | | 82 |
| IS5 | | 15 | | 1.5 | | | 0.5 | | | 1 | | 82 |
| IS6 | | 15 | | 1.5 | | | 2.5 | | | 1 | | 80 |
| CS6 | | 15 | | 1.5 | | | 3 | | | 1 | | 80 |
| CS7 | 15 | | | | 2 | | | 2 | | 0.5 | | 81 |
| IS7 | 15 | | | | 2 | | | 2 | | 1 | | 80 |
| IS8 | 15 | | | | 2 | | | 2 | | 5 | | 76 |
| CS8 | 15 | | | | 2 | | | 2 | | 5.5 | | 76 |
| CS9 | | | 15 | 2 | | | | | 1 | 2 | | 80 |
| CS10 | | | 15 | | 2 | | | | 1 | 2 | | 80 |
| CS11 | | | 15 | 2 | | | 1 | | | 1 | | 80 |
| CS12 | | | 15 | 2 | | | | 1 | | | 1 | 80 |

*IS: Inventive Sample, CS: Comparative Sample, *PE: Preparation Example

Experimental Example

Evaluation of Film Properties

Steel sheets plated with a Zn—Mg alloy were coated with Inventive Samples 1 to 8 and Comparative Samples 1 to 12 by using a bar coater, and the steel sheets were dried at 100° C. Thereafter, the steel sheets were left for 24 hours. The densities of dried coating films were 500 mg/m².

The blackening resistance ability of the films and the solution storability of the film formation composition samples were evaluated as shown in Tables 2 and 3. Table 2 shows evaluation results of Inventive Samples, and Table 3 shows evaluation results of Comparative Samples. Either of blackening resistance ability and solution storability was evaluated as good (O) or poor (X) as follows.

Blackening resistance ability: rust-preventing oil was applied to the steel sheets treated with the samples, and the steel sheets were left for 24 hours. Thereafter, 0.1-ml purified water droplets were dripped on three points of each steel sheet at intervals of 2 cm, and the steel sheet was folded. The folded steel sheet was left for 120 hours at a pressure of 10 kgf/cm² to 50 kgf/cm², a temperature of 50° C., and a humidity of 95%. Thereafter, the changes in colors ($\Delta E$) of the steel sheets were measured using a color difference meter. If $\Delta E$ was equal to or less than 4 ($\Delta E \leq 4$), the blackening resistance ability of a sample was determined as good, and if $\Delta E$ was equal to or greater than 4 ($\Delta E > 4$), the blackening resistance ability of a sample was determined as poor.

Solution storability: solutions of Inventive Samples and Comparative Samples were left at room temperature for days. If the appearance, color, or viscosity of a solution was not markedly changed (e.g., if the change of viscosity was less than 3 seconds), the storability of the solution was determined as being good, and otherwise as poor.

TABLE 2

| Evaluation items | IS1 | IS2 | IS3 | IS4 | IS5 | IS6 | IS7 | IS8 |
|---|---|---|---|---|---|---|---|---|
| Blackening resistance | O | O | O | O | O | O | O | O |
| Solution storability | O | O | O | O | O | O | O | O |

TABLE 3

| Evaluation items | Comparative Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Blackening resistance | X | X | X | X | X | X | X | X | X | X | X | X |
| Solution storability | O | O | O | O | O | O | O | O | O | O | O | O |

As shown in Tables 2 and 3, when films were formed of Inventive Samples of film formation compositions each including: 2.5 to 7.5 parts by weight of a water-soluble phenoxy resin; 0.1 to 0.5 parts by weight of a fluorometallic acid; 0.1 to 0.5 parts by weight of a metallic compound; and 1 to 5 parts by weight of a crosslinking agent, the blackening resistance ability of the films were good, and the solution storability of the Inventive Samples were good. However, the solution storability of Comparative Samples having composition different from that of Inventive Samples was poor, and the blackening resistance ability of films formed of Comparative Sample was poor.

The invention claimed is:

1. A composition for forming a blackening resistance film on a steel sheet containing magnesium, the composition comprising:
   3.75 to 7.5 parts by solid weight of a water-soluble phenoxy resin, wherein the water-soluble phenoxy resin has a number average molecular weight of 20,000 to 60,000;
   0.1 to 0.5 parts by solid weight of a metallic compound, wherein the metallic compound comprises a salt, oxide, or colloid and is eluted to form an insoluble oxide film; and 1 to 5 parts by solid weight of a crosslinking agent.

2. The composition of claim 1, wherein the fluorometallic acid comprises at least one selected from the group consisting of hexafluorotitanic acid, hexafluorosilicic acid, hexafluorozirconic acid, hexafluorotungstic acid, hexafluoromolybdic acid, and hexafluorogermanic acid.

3. The composition of claim 1, wherein the metallic compound comprises at least one of silicon, aluminum, manganese, titanium, cerium, zinc, molybdenum, vanadium, zirconium, and combinations thereof.

4. The composition of claim 3, wherein the metallic compound exists in water as a salt and/or a nano-sized colloid.

5. The composition of claim 1, wherein the crosslinking agent comprises at least one selected from the group consisting of 3-glycidoxypropyltrimethoxysilane, 2-(3/4-epoxycyclohexyl)ethyltrimethoxysilane, 2-(3,4-epoxycyclohexyl)ethyltriethoxysilane, and 3-glycidoxypropylmethyldiethoxysilane.

6. A steel sheet comprises:
magnesium on at least a surface thereof; and
a blackening resistance film formed by the composition of claim 1.

7. The steel sheet of claim 6, wherein the blackening resistance film is formed on the surface of the steel sheet containing magnesium and has a dry density of 100 mg/m$^2$ to 1000 mg/m$^2$.

8. The steel sheet of claim 6, wherein the steel sheet is a magnesium steel sheet, a magnesium-plated steel sheet, or a magnesium-alloy-plated steel sheet.

9. The steel sheet of claim 8, wherein the magnesium-alloy-plated steel sheet comprises a magnesium alloy plating layer selected from the group consisting of Zn—Al—Mg, Zn—Al—Mg—Si, Zn—Mg, Mg—Zn, Al—Mg, and Al—Mg—Si.

10. The steel sheet of claim 6, wherein the fluorometallic acid comprises at least one selected from the group consisting of hexafluorotitanic acid, hexafluorosilicic acid, hexafluorozirconic acid, hexafluorotungstic acid, hexafluoromolybdic acid, and hexafluorogermanic acid.

11. The steel sheet claim 6, wherein the metallic compound comprises at least one of silicon, aluminum, manganese, titanium, cerium, zinc, molybdenum, vanadium, zirconium, and combinations thereof.

12. The steel sheet of claim 6, wherein the metallic compound exists in water as a salt and/or a nano-sized colloid.

13. The steel sheet of claim 6, wherein the crosslinking agent comprises at least one selected from the group consisting of 3-glycidoxypropyltrimethoxysilane, 2-(3,4-epoxycyclohexyl)ethyltrimethoxysilane, 2-(3,4-epoxycyclohexyl)ethyltriethoxysilane, and 3-glycidoxypropylmethyldiethoxysilane.

* * * * *